United States Patent Office 3,430,130
Patented Feb. 25, 1969

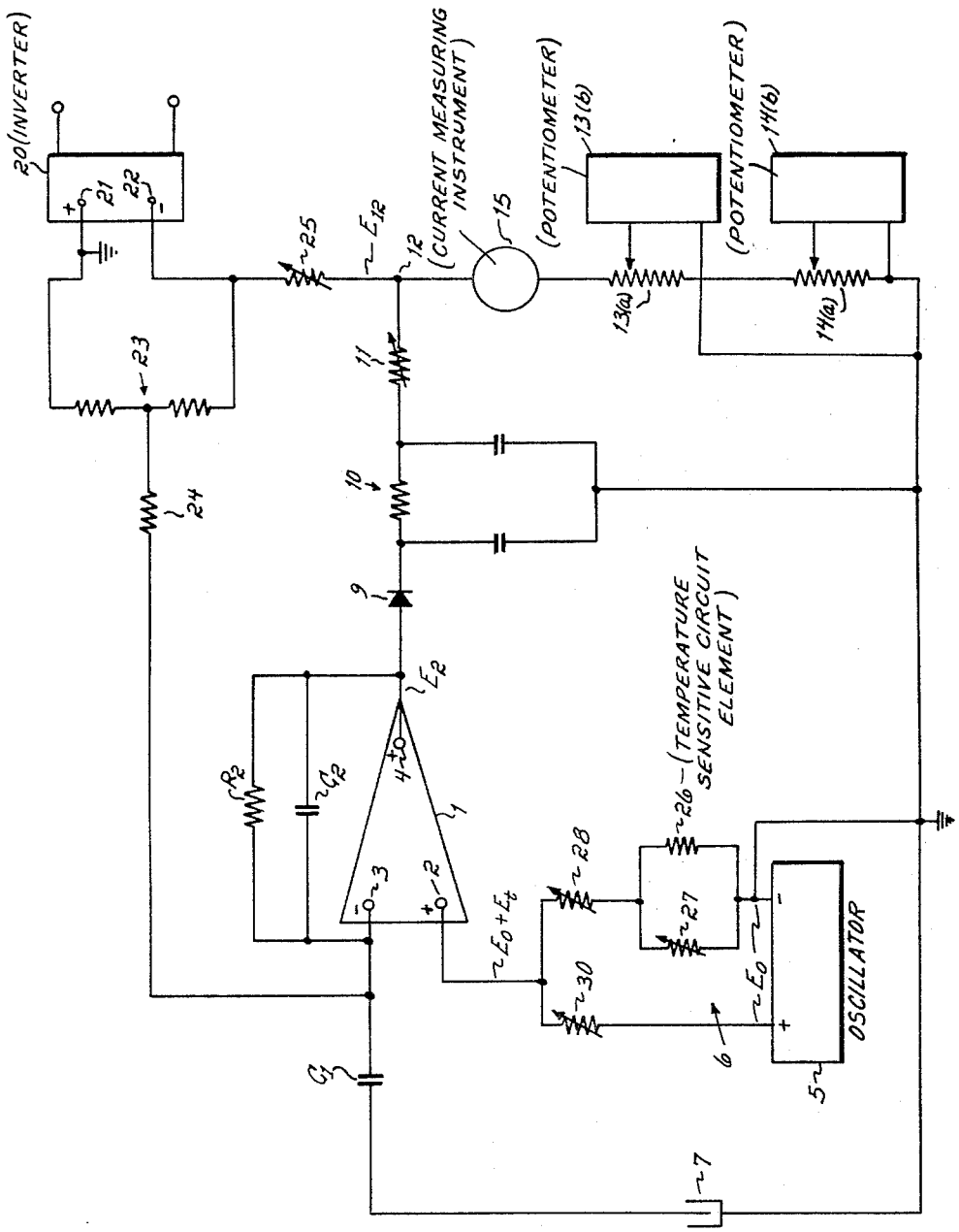

3,430,130
CONDUCTIVITY MEASURING CIRCUIT UTILIZING CONDUCTIVITY CELL AS INPUT RESISTANCE OF AN OPERATIONAL AMPLIFIER
Carl A. Schneider, 7229 Jethve Lane, Cincinnati, Ohio 45243
Filed May 20, 1966, Ser. No. 551,736
U.S. Cl. 324—30                    17 Claims
Int. Cl. G01r 11/44

ABSTRACT OF THE DISCLOSURE

A conductivity measuring circuit including an operational amplifier, a conductivity cell having one terminal connected to the summing point input of the operational amplifier via a D.C. current blocking capacitor and another terminal connected to a reference potential, and a source of alternating current potential connected between the reference potential and the other input of the operational amplifier. Also, included is a diode connected in the output circuit of the operational amplifier and a source of direct current bias potential connected to the input of the operational amplifier for establishing amplifier output to the diode sufficient to forward bias it into its low resistance operating range to avoid errors due to threshold effects in the diode resistance characteristic which exist at low voltage levels. A source of opposition potential is applied to the amplified signal for cancelling the components thereof introduced by both the direct current bias potential and the alternating current electrode potential, thereby eliminating measurement errors introduced by the bias potential and the alternating current electrode potential. Automatic temperature compensating circuitry is also provided by means of a temperature sensitive element connected between the alternating current source and the operational amplifier. This is effective to decrease the operational amplifier input, and hence the potential across the cell electrode, in response to an increase in fluid temperature thereby producing a correspondingly low amplifier output signal, the amount the output signal is lowered being proportionate to temperature change. The temperature sensitive element produces a similar result, but in the opposite direction if the fluid temperature decreases. Also included are suitable circuit means in the output circuit of the operational amplifier for accomplishing zero adjust in the output level and/or facilitating calibration of the conductivity indicating instrument.

This invention relates to resistance and/or conductivity measuring apparatus and is more particularly directed to a conductivity measuring system which receives a continuous electrical input correlated with the conductivity of a sample and which provides a continuous electrical output signal linear throughout the entire operating range of the system. This output signal can be utilized to operate a local recorder, be telemetered to a remote central unit, or both.

In recent years, governmental bodies at all levels have placed an increased emphasis on the purification of natural water resources, such as, rivers, lakes, streams, bays, etc., located within their jurisdictional boundaries. In attempting to purify natural water resources, it has become necessary to develop methods and apparatus for determining the impurity content of the water. In response to this need, various methods and apparatus have been developed in an attempt to continuously monitor a multitude of parameters, such as, water temperature, pH, dissolved chloride content, turbidity, conductivity, etc. Of these parameters, conductivity has been found to be very useful in analyzing the impurity content of water. Its value as such is predicated upon the fact that the conductivity of water is proportional to the quantity of ionizable dissolved solids, which in turn is a function of the impurity content of the water.

Conductivity measurements have been made on a laboratory basis for many years. In general, the conductivity of a solution is measured with the aid of a conductivity cell which is immersed in the solution whose conductivity is to be measured. The conductivity cell consists of a pair of spaced electrodes connected to a source of potential. When the electrodes are placed in a solution, current flows between the electrodes in an amount which is proportional to the concentration of ionizable dissolved solids present in the solution. This current can then be measured to determine the conductivity of the solution and an indication of the impurity level obtained.

The conductivity cell in effect functions as a variable resistance, the value of resistance being dependent on the ion concentration of the solution, which in turn is a function of the concentration of ionizable solid material present in the solution as well as the solution temperature. In effect, therefore, conductivity is measured by measuring the resistance of the quantity of the solution located in the path between the electrodes. From this resistance, the conductivity of the solution may be determined knowing the cell constant, which is merely a proportionality constant relating the conductivity of a solution to the resistance of a given conductivity cell when immersed in the solution.

In the laboratory, the measurement of conductivity can be made with great accuracy and methods and apparatus for doing so have achieved a high degree of refinement. Unfortunately, the success met in making laboratory conductivity measurements has not, as a practical matter, been duplicated in the area providing useful conductivity data relative to the nation's natural water resources such as its rivers, lakes, bays, etc. The reasons for this are varied and numerous.

To appreciate the problems involved, it is necessary to understand the nature of the conductivity monitoring process. For example, experience has shown that in order to fully appraise the effect of all of the factors affecting water condition, it is desirable to provide very frequent, or even continuous, measurements of conductivity. These measurements are preferably made at scattered and often remote places along the body of water being monitored.

It has also been found desirable to assemble the data from these scattered installations at a central station where it can be combined with other types of data, such as, pH, turbidity, etc. relating to additional parameters being monitored, thereby providing along with the other information, a continuous and current picture of the conductivity levels at various points on the body of water. The handling of the data at the central station is usually accomplished utilizing a single recorder in conjunction with time multiplexing techniques. For example, the outputs of a variety of measuring instruments of a given installation, such as, conductivity, pH, etc. will be sequentially sampled and transmitted to a central station where, following analog to digital conversion, a digital printout of the sequence of readings is provided by a single, shared recorder. In order that other data can be recorded along with conductivity data utilizing a single recording instrument, it is necessary that the outputs provided by all the various measuring circuits be linear. Otherwise, it would be necessary to match the nonlinearity characteristics of each and every measuring circuit, which from a practical standpoint is not feasible. In addition, linearity is essential for analog to digital conversion if the use of complicated and expensive digitizing equipment is to be avoided.

In the past, the prior art measuring circuits in attempting to obtain a linear output, and still achieve the sensitivity required in handling currents on the order of microamperes, have resorted to the use of bridge circuit configurations. Bridge circuit configurations, while not providing a truly linear output, do provide a substantially linear output if their use is restricted to a small fraction of the available range. It has generally been the case that this fraction corresponds to approximately a 10:1 ratio of conductivity values. Stated differently, a bridge circuit yields a substantially linear output providing the largest conductivity to be measured does not exceed the smallest by a factor greater than 10:1. The problem, however, is that under many actual measuring conditions, the conductivity at a given installation may vary by as much as 40:1 during the course of a day. For example, many rivers at their mouth will have a conductivity change in the neighborhood of 40:1 due to cyclical tidal variations which vary the salt concentration of the water. The nonlinearity of a bridge circuit under such conductivity variations is totally intolerable, particularly, if as in many installations, an overall accuracy of 1% or better is desired.

Accordingly, the principal object of this invention has been to provide a conductivity measuring system which has a linear response characteristic over an extended operating range. In accordance with the principles of the present invention, this object is achieved by combining in a novel way the unique characteristics of an operational amplifier with the particular relationship of the conductivity of a sample to its resistivity as measured by a conductivity cell.

More particularly, one preferred measuring system embodying the principles of the present invention includes a conductivity cell effective to measure the resistivity of a sample of water and an operational amplifier having a pair of input terminals and an output terminal. The conductivity cell is connected between ground potential and the operational amplifier summing point. A source of alternating current potential is connected between ground potential and the other input terminal. The alternating current signal, due to the negative feedback and high open loop gain of the amplifier which reduces the input voltage differential to zero, appears at the ungrounded cell terminal, providing the necessary operating potential across the electrodes of the conductivity cell. A rectifier is connected to the output of the amplifier for providing a direct current signal linearly related to the amplifier output.

To further enhance and optimize the linearity characteristics of the system described thus far, there has been provided, in accordance with an additional object of this invention, means for eliminating errors encountered under extreme measuring conditions such as exist when very low and very high conductivities are present. More specifically, to eliminate errors at extremely low conductivity levels, a biasing signal supplied by a first direct current potential is input to the operational amplifier for establishing an amplifier output to the rectifier sufficient to forward bias it into its low resistance operating range. This bias avoids errors due to threshold effects in the rectifier resistance characteristic which exist at low voltage levels. Elimination of errors at high conductivities is accomplished by providing an opposition potential which is applied to the amplified signal for cancelling the components thereof introduced by both the direct current bias potential and the alternating current electrode potential. The direct current signal remaining is a linear function of the cell resistance and/or conductivity of the solution in which the cell is immersed.

This system is effective to provide a linear response over its entire operating range. As a result, resistances and/or conductivities can be measured which vary by a factor of 40:1 or greater and a linear output signal provided.

Another characteristic unique to monitoring the conductivity of natural water resources which leads to problems not generally present under laboratory conditions is the wide fluctuations in water temperature due to constantly changing ambient conditions. Since resistance and/or conductivity is a function of the temperature of the solution as well as the ionizable solid concentration, when a resistance and/or conductivity change has occurred it is difficult to determine whether the solid content has changed, or just the temperature, or both. Therefore, an indication of the resistance and/or conductivity of a solution is meaningless if it is not referenced to some preselected temperature. It is, of course, possible to record the temperature each time a conductivity and/or resistance measurement is made. While this permits the readings to be corrected and referenced to a single temperature at a later time, it is too time consuming and unwieldly for use in most water monitoring systems.

Accordingly, another object of the present invention is to provide a novel means for automatically compensating for temperature changes so that the output conductivity measurement signal is always referenced to a preselected reference temperature, such as 25° C. Thus, an operator using the data knows that variations in resistance and/or conductivity indications, which have been recorded, are due to variations in the concentration of ionized solids rather than to changes in the temperature of the solution.

In the past it has been proposed, where temperature compensation of an operational amplifier in other environments is desired, to use a temperature sensitive resistance element, such as a thermistor, in the feedback circuit of the amplifier. This is effective to vary the gain of the amplifier in accordance with the temperature fluctuations, thereby providing the necessary temperature compensation. This proposal, however, is not satisfactory for use in the present system because, for low cell resistance (high solution conductivity) measurements, the operational amplifier feedback resistor experiences high currents, which cause Joulean heating of the feedback resistor, introducing error into the temperature compensation network.

Additionally, another disadvantage with the prior art proposal for temperature compensation of operational amplifier circuits is that each time the conductivity cell is removed and a different cell substituted in its place having a cell constant different from the proceding cell, the temperature compensation circuit must be appropriately modified so as to achieve the former temperature compensation characteristics. Such circuit modifications, since they involve the amplifier feedback resistor, are time consuming and, therefore, undesirable.

In contrast, the novel temperature compensation means of the present invention can be utilized to provide automatic temperature compensation in systems for measuring large conductivities and systems employing different conductivity cells without the need for material modifications in circuitry. These results are accomplished in accordance with one aspect of this invention by adjusting the operational amplifier output signal in accordance with the variations in temperature of the fluid whose resistance and/or conductivity is being measured. The required adjustment in operational amplifier output necessary for temperature compensation is effected by providing a temperature compensated input to the operational amplifier. This input varies in accordance with temperature in such a manner that the operational amplifier output, which is produced in response to the conductivity cell input to the amplifier, is altered to the extent necessary to cancel temperature-induced changed in the conductivity-correlated output signal of the measuring circuit.

To provide the temperature compensated input to the operational amplifier, a temperature sensitive element is connected between the alternating current source and the operational amplifier. This element is effective to decrease the operational amplifier input and, hence, the potential across the cell electrodes in response to an increase in fluid temperature, thereby producing a correspondingly lower amplifier output signal, the amount the output signal is lowered being proportional to the temperature change. The temperature sensitive element produces a similar result, but in the opposite direction, if the fluid temperature decreases.

Since the maximum input to the operational amplifier from the alternating current source is on the order of hundreds of millivolts, the temperature sensitive element is not subject to undesirable Joulean heating effects as in the proposed prior art temperature compensating circuits. Hence, distortion does not occur when high conductivities are measured. Additionally, when cells are interchanged, altering the cell constant, the temperature compensation circuitry may be appropriately readjusted by merely varying the resistance of one or more variable resistors connected in circuit arrangement with the temperature sensitive element, which are provided for this purpose. Hence, relatively time consuming changes in the feedback circuitry of the operational amplifier are unnecessary.

Another problem unique to conductivity monitoring of natural water resources which is not present on a laboratory scale relates to adjusting and calibrating the measuring circuitry. In the laboratory, complex calibrating procedures can be tolerated because the necessary electronic equipment is readily available. However, at a remotely located monitoring installation, such is not usually the case. Rather, it is desirable that conductivity measuring circuits designed for use in monitoring natural water resources be easily recalibrated under field conditions and with a minimum of electronic test equipment necessary. If periodic recalibrations, which are unavoidable due to uncontrollable circuit drift, can be made only with the aid of complicated procedures and elaborate electronic equipment, the cost and time consumed in operating conductivity monitoring stations soon becomes unduly large, eventually outweighing the value of the data provided.

It has, therefore, been a further object of this invention to provide a conductivity and/or resistance measuring circuit which can be recalibrated under field conditions with a minimum of effort and equipment. In the measuring circuit of this invention, this objective is accomplished by providing a first variable impedance to zero-adjust the scale of a conductivity-calibrated, current responsive instrument. This impedance is connected between the output of the operational amplifier and the source of opposition potential used to cancel the effects introduced by the direct current bias and alternating current cell electrode potentials input to the amplifier. Variation of this impedance effectively adds to, or subtracts from, the signal level at the output of the rectifier, selectively raising it or lowering it, depending upon the direction of change of the impedance. This, in turn, has the effect of varying the zero point of the current responsive measuring device coupled to the rectifier output. Stated differently, this varying of the impedance has the effect of shifting the scale of the current responsive measuring instrument up or down a uniform amount over the entire scale range. The amount and direction of the scale shifts depends upon the magnitude and direction of the impedance change.

To calibrate the conductivity indicating instrument in order that a full scale conductivity measurement is obtained when the cell is immersed in a standard solution adapted to provide a full scale indication, a second variable impedance is employed. This impedance is connected between the rectifier and the first impedance. By varying the value of this second impedance, it is possible to vary the current input to the indicating instrument as necessary to thereby obtain the full scale conductivity indication in accordance with the conductivity of the standard solution being utilized for calibration purposes.

Thus, a resistance and/or conductivity measuring circuit has been provided which can, with simple procedures and standard solutions only, be zero corrected and recalibrated under field conditions. This is in contrast to the complicated procedures and elaborate equipment necessary with prior art proposals.

These and other objects and advantages of the present invention will be more readily apparent from a consideration of the following detailed description of the drawing illustrating a preferred embodiment of the invention.

The drawing is a schematic circuit diagram of a preferred conductivity and/or resistance measuring circuit constructed in accordance with the principles of this invention.

In accordance with a preferred embodiment of the invention, the measuring circuit includes an operational amplifier 1 having a feedback resistor $R_2$, positive and negative input terminals 2 and 3, respectively, and a positive output terminal 4. A preferred operational amplifier is of the type manufactured by George Philbrick Researchers, located in Boston, Mass., Model P-65-A. However, any direct coupled negative feedback amplifier having a high open loop gain may be utilized. The polarity designations on the operational amplifier terminals reflect the direction of change in the output resulting from given polarity inputs. For example, increasingly positive and negative signal inputs to terminals 2 and 3, respectively, produce an increasingly larger positive output. Likewise, a reversal of polarity to one or both of the inputs will produce a less positive output. A feedback capacitor $C_2$ is connected between terminals 3 and 4 in shunt with the feedback resistor $R_2$ to provide substantially 100% feedback at higher frequencies, thereby avoiding undesirable oscillations at these frequencies.

A grounded oscillator 5 preferably having a precisely controlled 1000 c.p.s. square wave output with a peak-to-peak voltage of 200 millivolts is input to the positive terminal 2 of the operational amplifier 4 through a temperature compensation circuit 6 to be described later. While the oscillator amplitude can be varied from the preferred value indicated, the amplitude selected must be substantially larger than the cumulative amplifier drift expected during the intervals between circuit calibration. The exact ratio between drift and oscillator amplitude depends on the degree of accuracy desired, larger ratios giving greater accuracy. Oscillators having non-square wave outputs may be utilized, the square wave being preferred only because it is readily controlled. Likewise, frequencies other than 1000 c.p.s. may be employed. This frequency is preferred merely because it represents a frequency which, while being sufficiently high to avoid conductivity cell polarization effects, is not high enough to introduce errors into the measurement circuit due to the cell shunting effect of stray capacitance introduced by wiring, etc.

A grounded conductivity cell 7, which is immersed in the fluid whose conductivity is to be measured, is connected to the negative input terminal 3, which constitutes the summing point of the operational amplifier 1, through a coupling capacitor $C_1$ designed to block direct current. A preferred conductivity cell which has been found to possess high stability and accuracy is disclosed and claimed in the copending application of Carl A. Schneider for "Electrolytic Conductivity Cell," Ser. No. 551,737, filed May 20, 1966. In brief, conductivity cells comprise a pair of spaced electrodes. The fluid whose conductivity is to be measured is positioned between the electrodes, effectively forming a resistor of controlled geometry. The value of the resistance of the fluid sample intermediate the electrodes can then be measured and the conductivity thereof determined knowing the cell constant. The cell constant, which depends on cell geometry, constitutes the proportionality constant between the conductivity of the fluid and the measured resistance of the fluid sample, the sample being defined by the cell electrode spacing and geometry.

In practice, the cell constant is chosen such that for a given maximum expected conductivity (minimum cell resistance), the current through the cell will be low to thereby minimize polarization effects. This practice also limits the smallest cell resistance which the circuit must measure to a value which can be handled without the introduction of large percentile errors. As those skilled in the art appreciate, small resistance values are not accurately measured without relatively complex equipment. Therefore, it is desirable to select a cell constant which, over the conductivity range contemplated, does not involve the measurement of unduly small cell resistance values.

A diode 9 and conventional *pi* filter configuration 10 are serially connected between the operational amplifier output terminal 4 and a variable instrument calibrating resistor 11, providing a smooth DC signal correlated with the resistance of the conductivity cell 7 and, hence, with the conductivity of the fluid in which the cell 7 is immersed. Serially connected between the other side 12 of the calibrating resistor 11 and ground are a current measuring instrument 15 and a pair of precision potentiometers 13a and 14a across which are connected voltage measuring instruments 13b and 14b. The current measuring instrument 15 must be compatible with the particular amplifier selected; for the preferred amplifier indicated previously, an instrument having a range of 0–500 microamperes, is suitable.

The voltage measuring instruments 13b and 14b, respectively, provide inputs to telemetering and recording equipment (not shown). Since conductivity measurement is basically a current measuring operation, reliable measurements of cell resistance and, hence, conductivity, can be made by measuring the voltage across precision resistance elements, such as potentiometers 13a and 14a, through which the current to be measured is flowing. Knowing the resistance of the potentiometers 13a and 14a and the voltage thereacross, the current can then be easily determined and correlated with conductivity. In practice, it has been found that voltage measuring instruments 13b and 14b having full scale ranges of 0–1000 microvolts and 0–50 microvolts, respectively, provide satisfactory signals for driving telemetering and recording equipment, respectively. The impedances of the instruments 13b and 14b must be large relative to the potentiometer resistances they shunt in order that intolerable errors not be introduced into the measurements. In practice, the larger the impedance of the instrument relative to the potentiometer resistance shunted, the less the percentage error in conductivity measurement.

The preferred embodiment also includes an inverter circuit 20 which transforms 117 volts AC to 5 volts DC. The output terminals 21 and 22, the positive terminal 21 of which is grounded, are connected across a voltage divider 23. The voltage divider 23 applies a negative bias signal of approximately 2.5 volts DC through a resistor 24 to the negative input terminal 3 of the operational amplifier 1. This negative DC bias signal, when applied to the negative terminal 3, produces at the positive output terminal 4 of the operational amplifier a positive DC output signal component which is large enough to insure that the forward bias on the diode 9 causes the diode to operate in its substantially negligible resistance range. The magnitude of this DC output signal component is independent of cell resistance variations; in fact, the magnitude, which is proportional to $$\frac{R_2}{R_b}E_b$$

where $R_2$ is the feedback circuit resistance, $R_b$ is bias circuitry resistance, and $E_b$ is the bias potential, is a function only of the bias signal and impedance of the bias signal source and feedback circuit. Since for any selected bias level, the impedance of the bias source and feedback circuit remains unchanged, the magnitude of the DC output signal component of the amplifier is constant, enabling it to be cancelled from the circuit output signal in a manner to be described.

The negative terminal 22 of the inverter 20 is connected through a zero adjusting resistor 25 to the indicating instrument input terminal 12. The effect of this circuit connection is twofold. First, the constant valued DC output component of the operational amplifier $$\frac{R_2}{R_b}E_b$$

necessary to insure operation of the diode in the negligible resistance range, which was provided by the negative bias applied to the terminal 3 of the operational amplifier, is removed, thereby rendering the signal present at terminal 12 independent of the negative bias applied to input terminal 3.

To appreciate the second effect of connecting the negative terminal 22 to the terminal 12, it is first necessary to set forth the following relationship:

$$E_2 \alpha \frac{R_2}{R_1}(E_o+E_t)+(E_o+E_t)+E_b\frac{R_2}{R_b}$$

where, $E_2$ is the output of the operational amplifier taken at terminal 4, $E_o$ is the output of the oscillator 15, $E_t$ is the change in the oscillator output $E_o$ introduced by the temperature compensation network 6, $E_b$ is the bias signal applied to terminal 3, which is removed from the output $E_{12}$ at terminal 12 in the manner described in the preceding paragraph, $R_1$ is the resistance of the conductivity cell 7, and $R_2$ is the resistance of the amplifier feedback resistor, and $R_b$ is the resistance of the circuitry supplying the bias signal $E_b$.

To reduce the percentage error in measuring the cell resistance $R_1$, particularly at high resistance values where the ratio $R_2/R_1$ approaches unity, the second term $(E_o+E_t)$ in the above equation should be eliminated from the operational amplifier output in addition to the third term which has already been cancelled in the manner described in the preceding paragraph. Hence, it becomes necessary to subtract from the output $E_2$ the second term $(E_o+E_t)$. The second effect, therefore, of connecting the negative terminal 22 of the inverter 20 to the terminal 12 is the subtraction of the undesired second term $(E_o+E_t)$ from the signal $E_2$ so that the resultant signal $E_{12}$ appearing at terminal 12 does not contain this term, thereby reducing the percentage error involved in measuring the cell resistance $R_1$. The resultant signal $E_{12}$ at terminal 12 is then represented by the following relationship:

$$E_{12} \alpha \frac{R_2}{R_1}(E_o+E_t)$$

the undesired second and third terms introduced by the biasing source and alternating current source having been eliminated.

A significant advantage of utilizing the same source 20 to both apply the bias to the amplifier input terminal 2 and cancel the effects of the bias present at the amplifier output terminal 4, is that fluctuations in the inverter potential do not affect the circuit operation. For example, should the bias potential drop, the fraction of the amplifier output subtracted to cancel for bias effects also drops. Thus, fluctuations of the inverter output affect the biasing and bias-correcting operations in such a manner that compensation therefor is automatically provided.

The temperature compensating network 6 references the cell conductivity measurements provided at terminal 12 to a predetermined reference temperature, which preferably is 25° C. This temperature compensating network includes a temperature sensitive circuit element 26, preferably a thermistor, connected between the negative output terminal of the oscillator 5 and terminal 2 of the operational amplifier 1. To modify the negative sloping exponential resistance-temperature characteristic of the temperature compensating network 6, the thermistor is connected in series with a variable resistor 28 and is shunted by a variable resistor 27. By proper trial and error manipulation of the resistance of the resistors 27 and 28, the combined resistance-temperature characteristic of the temperature compensating circuit 6 can be made to substantially match the resistance-temperature characteristic of the conductivity cell.

Assuming the conductivity measurement is referenced to 25° C., if the fluid temperature rises above the reference temperature of 25° C., the conductivity rises correspondingly, causing the cell resistance to decrease and the signal at terminal 12 to increase, introducing an error into the conductivity measurement in the form of an increased conductivity indication. To compensate for this temperature-induced increase in the fluid conductivity indication, the output signal at terminal 12 is reduced by an amount corresponding to the increase caused by the rise in temperature, restoring the output signal at terminal 12 to its pretemperature increase level. This reduction in output signal at terminal 12 is accomplished by the temperature compensating circuit 6.

The temperature compensating circuit 6 reduces the input to terminal 2 of the operational amplifier by an amount equal to the increase in output signal at terminal 12 caused by the temperature increase. More specifically, the temperature compensating circuit corrects the oscillator output $E_o$ by reducing the input signal at terminal 2 by $E_t'$ which is correlated with the increase in temperature. As the temperature rises, the resistance of the thermistor 26 decreases, allowing more current to flow through a series dropping resistor 30 connected between the positive oscillator output terminal and the resistor 28, causing an increased voltage drop across the resistor 30. This increased voltage drop is reflected at the operational amplifier as a decrease in the signal input to terminal 2 which in turn restores the output signal at terminal 12 to its lower, pretemperature increase level, thereby referencing the conductivity measurement to the reference temperature of 25° C.

The reverse of the foregoing correction process occurs if the temperature of the fluid decreases. Specifically, the resistance of the thermistor 26 rises, raising the level of the input to terminal 2 by an amount $E_t''$. This in turn increases the output signal at terminal 12, restoring the output signal to its pretemperature decrease level.

The circuit and its various instruments 15, 13(b) and 14(b) are zero adjusted and calibrated in the following manner. The cell 7 is immersed in a standard solution of known conductivity calculated to provide a reading of approximately one-sixth of full scale or less. Under these conditions, zero adjust resistor 25 is varied, effectively substracting more or less from the output of the signal at terminal 12, until the indicating meter 15 provides a visual conductivity measurement corresponding to the known conductivity of the standard solution. This zero adjustment has the effect of shifting the scale of the indicating instrument 15 up or down, depending on the amount and direction of the variation made in the resistance of the resistor 25. The amount of scale shift for a given adjustment in the resistance of the resistor 25 is uniform throughout the entire scale range.

Following the zero adjustment, the meter 15 is calibrated. This is accomplished by placing the cell 7 in a standard solution having a conductivity adapted to give a full scale indication and which is at the same temperature as that of the previous solution. The calibrating resistor 11 is then varied, adjusting the current through the meter 15 until a full scale conductivity indication is obtained. This calibrating adjustment does not affect the previously made zero adjustment.

Using the same solution as immediately above, the voltage measuring instruments 13(b) and 14(b) are calibrated by adjusting the potentiometers 13(a) and 14(a), respectively, until their associated voltage measuring instruments give full scale indications. As indicated previously, providing that the impedance of the instruments 13(b) and 14(b) is large relative to the respective potentiometer resistances they shunt, the errors in the indications produced by these instruments can be held to very low values.

Adjustment of the temperature compensation circuit is made by immersing the cell in a solution of known conductivity maintained at 25° C., or some other convenient reference temperature, and adjusting the resistors 27 and 28 until the measuring instruments indicate the known conductivity value. The solution temperature is then increased and the resistors 27 and 28 again varied until the known value of conductivity referenced at 25° C. is indicated by the measuring instruments. Thereafter, the solution temperature is decreased to a temperature below 25° C. and the values of the resistors again varied until the instruments indicate the conductivity as referenced to 25° C. The above procedure is repeated until, without adjusting the resistors 27 and 28, the instrument conductivity indication remains unchanged at the 25° C. referenced conductivity value for the various solution temperatures.

In operation, the temperature compensated oscillator output $(E_o+E_t)$ is input to the operational amplifier at terminal 2 and the DC biasing potential $E_b$ is input at terminal 3. The amplifier 1 due to its negative feedback characteristics drives the input voltage at terminal 1 to a value of $(E_o+E_t)$ to thereby reduce the voltage input differential between terminals 2 and 3 to zero. The reduction of the input voltage differential to zero produces across feedback resistor $R_2$ a voltage drop of a magnitude and polarity such as to make the output voltage of the operational amplifier $$E_2 \alpha \frac{R_2}{R_1}(E_o+E_t)+(E_o+E_t)+E_b\frac{R_2}{R_b}$$

Thus, the output voltage at terminal 4 of the operational amplifier comprises a variable component $$\frac{R_2}{R_1}(E_o+E_t)$$

which is inversely proportional to the resistance $R_1$ of the conductivity cell 7 and, hence, directly proportional to the conductivity of the fluid in which the cell is immersed, a substantially constant component $(E_o+E_t)$ which is directly proportional to the sum of the output of the oscillator $E_o$ and a temperature dependent component $E_t$ correlated with the temperature of the fluid, and a constant component $$\frac{R_2}{R_b}E_b$$

As the conductivity of the fluid in which the cell 7 is immersed changes, the resistance $R_1$ varies causing the value of $E_2$ to vary in accordance with the above equation. A DC signal proportional to the operational amplifier output $E_2$ is then obtained by rectifying and filtering. This rectified and filtered signal output from the filter 10 passes through a meter calibrating resistor 11 to the terminal 12 where the output signal is corrected by subtracting therefrom the effects of both the DC bias $E_b$ applied to the input terminal 3 and the oscillator output $E_o$. The resulting output $E_{12}$ at terminal 12 is a temperature corrected function of the resistance of the conductivity cell, namely, $$E_{12} \alpha \frac{R_2}{R_1}(E_o+E_t)$$

Specifically, the output voltage $E_{12}$ at terminal 12, which includes the temperature correction factor $E_t$, is inversely proportional to the resistance of the conductivity cell 7 and, because of the inverse relationship between resistance and conductivity, is directly proportional to the conductivity of the fluid in which the cell is immersed.

Having described my invention, I claim:

1. A circuit for producing an electrical output signal correlated with the conductivity of a sample of fluid, comprising:

a conductivity cell having two spaced electrodes in contact with said fluid sample;
a reference potential;
a high open loop gain amplifier having a first input terminal connected through said conductivity cell to said reference potential, a second input terminal, and an output terminal;
a source of alternating current input potential connected between said reference potential and said second input terminal;
negative feed back means connected between said output terminal and said first terminal for maintaining said input terminals at substantially the same potential;
rectifying means connected to said output terminal for providing a direct current signal; and
a source of opposition potential connected to the output of said rectifying means for substantially cancelling the component of said direct current signal correlated with said input potential, thereby providing a resultant direct current signal correlated with said conductivity of said sample fluid.

2. The circuit of claim 1 further comprising referencing means connected to one of said input terminals for referencing said resultant direct current signal to a predetermined reference temperature.

3. The circuit of claim 2 wherein said referencing means comprises a temperature sensitive means connected between said alternating current source and said second input terminal for altering the output of said alternating current source input to said amplifier in accordance with the temperature fluctuations of said sample fluid.

4. The circuit of claim 3 wherein said temperature sensitive means comprises a thermistor and further including variable impedance means connected to said thermistor for modifying the temperature-resistance characteristic of said temperature sensitive means.

5. A circuit for producing an electrical output signal correlated with the conductivity of a sample of fluid, comprising:

a conductivity cell having two spaced electrodes in contact with said fluid sample;
a reference potential;
a high open loop gain amplifier having a first input terminal connected through said conductivity cell to said reference potential, a second input terminal and an output terminal;
a source of alternating current input potential connected between said reference potential and said second input terminal;
negative feedback means connected between said output terminal and said first terminal for maintaining said input terminals at substantially the same potential;
rectifying means connected to said output terminal for providing a direct current signal; and
a first direct current source of biasing potential connected to one of said input terminals for producing a constant amplifier direct current output component to minimize the resistance of said rectifying means, and a second direct current potential source of opposition potential connected to the output of said rectifying means to cancel said constant direct current amplifier output component.

6. The circuit of claim 5 further comprising referencing means connected to one of said input terminals for referencing said conductivity correlated direct current signal to a predetermined reference temperature.

7. A circuit for producing an electrical output signal correlated with the conductivity of a sample of fluid, comprising:

a conductivity cell having two spaced electrodes in contact with said fluid sample;
a reference potential;
a high open loop gain amplifier having a first input terminal connected through said conductivity cell to said reference potential, a second input terminal and an output terminal;
a source of alternating current input potential connected between said reference potential and said second input terminal;
negative feedback means connected between said output terminal and said first terminal for maintaining said input terminals at substantially the same potential;
rectifying means connected to said output terminal for providing a direct current signal;
a first direct current source of biasing potential connected to one of said input terminals for producing a constant direct current amplifier output component to minimize resistance of said rectifying means; and
a second direct current source connected to the output of said rectifying means to cancel said constant direct current amplifier component and said rectifier output component correlated with said alternating current input potential.

8. The circuit of claim 7 further comprising referencing means connected to one of said input terminals for referencing said direct current signal to a predetermined reference temperature.

9. The circuit of claim 7 further comprising variable impedance means connected between said second direct current source and said amplifier output for shifting the potential at the output of said rectifying means.

10. The circuit of claim 7 further comprising meter means and a first variable impedance means connected between said meter means and said amplifier output for varying the relationship between the output of said meter means and the conductivity of said sample fluid.

11. The combination of claim 7 further comprising meter means having a scale, and first and second variable impedance means serially connected between said amplifier output and said second direct current source for shifting said scale of said meter means and for varying the relationship between the output of said meter means and the conductivity of said sample fluid, said meter means being connected between said reference potential and a point intermediate said first and second impedance means.

12. The combination of claim 11 wherein said meter means comprises a current responsive means in series with the parallel combination of a third impedance means and a voltage responsive means, and wherein said scale shifting is independent of said relationship between said meter means output and said fluid sample conductivity.

13. The circuit of claim 12 further including referencing means connected to one of said input terminals for referencing said conductivity correlated signals to a predetermined temperature.

14. The circuit of claim 13 wherein said referencing means comprises a temperature sensitive means connected between said alternating current source and said second input terminal for altering the output of said alternating current source which is input to said amplifier in accordance with the temperature fluctuations of said fluid sample.

15. The circuit of claim 14 wherein said temperature sensitive means comprises a thermistor and further including variable impedance means connected to said thermistor for substantially modifying the temperature-resistance characteristic of said temperature sensitive means.

16. A circuit for producing an electrical output signal correlated with the conductivity of a sample of fluid comprising:
- a conductivity cell having two spaced electrodes in contact with said fluid sample;
- a reference potential;
- a high open loop gain amplifier having a first input terminal connected through said conductivity cell to said reference potential, a second input terminal, and an output terminal;
- a source of input potential connected between said reference potential and said second input terminal;
- negative feedback means connected between said output terminal and said first terminal for maintaining said input terminals at substantially the same potential, whereby the potential difference between said output terminal and said reference potential is correlated with the conductivity of said fluid sample; and
- referencing means connected to one of said input terminals for referencing said potential difference between said output terminal and said reference potential to a predetermined reference temperature.

17. A circuit for producing an electrical output signal correlated with the conductivity of a sample of fluid, comprising:
- a conductivity cell having two spaced electrodes in contact with said fluid sample;
- a reference potential;
- a high open loop gain amplifier having a first input terminal connected through said conductivity cell to said reference potential, a second input terminal, and an output terminal;
- a source of input potential connected between said reference potential and said second input terminal;
- capacitance means connected in series with said conductivity cell; and
- negative feedback means connected between said output terminal and said first terminal for maintaining said input terminals at substantially the same potential, whereby the potential difference between said output terminal and said reference potential is correlated with the conductivity of said fluid sample.

References Cited

Mueller et al.: Analytical Chemistry, vol. 37, No. 1, January 1965; pp. 13–29; 324—30. Copy in Scientific Library (QD 71.142).

RUDOLPH V. ROLINEC, *Primary Examiner.*

C. F. ROBERTS, *Assistant Examiner.*

U.S. Cl. X.R.

324—123